(12) United States Patent
Kim

(10) Patent No.: US 7,233,486 B2
(45) Date of Patent: Jun. 19, 2007

(54) COMPUTER SYSTEM HAVING INTERCHANGEABLE LCDS

(75) Inventor: Tae-sang Kim, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 10/290,502

(22) Filed: Nov. 8, 2002

(65) Prior Publication Data

US 2004/0004810 A1    Jan. 8, 2004

(30) Foreign Application Priority Data

Jul. 2, 2002    (KR) .............................. 2002-37975

(51) Int. Cl.
*G06F 1/16* (2006.01)
(52) U.S. Cl. ........................ 361/681; 349/58
(58) Field of Classification Search ........ 361/681–683; 248/924; 345/169, 58, 905
See application file for complete search history.

(56) References Cited

U.S. PATENT DOCUMENTS

| | | | |
|---|---|---|---|
| 5,008,487 A | 4/1991 | Shimmyo | |
| 5,097,388 A | 3/1992 | Buist et al. | |
| 5,928,320 A | 7/1999 | Forsythe | |
| 6,002,582 A | 12/1999 | Yeager et al. | |
| 6,188,569 B1 | 2/2001 | Minemoto et al. | |
| 6,219,228 B1 | 4/2001 | Sun | |
| 6,563,705 B1 * | 5/2003 | Kuo | 361/687 |
| 2003/0063432 A1 * | 4/2003 | Farrow et al. | 361/680 |

FOREIGN PATENT DOCUMENTS

| | | |
|---|---|---|
| CN | 98241276.2 | 2/2000 |
| JP | 09-002578 | 10/1997 |
| JP | 10-69328 | 10/1998 |
| JP | 2000-47754 | 2/2000 |
| JP | 2000-357027 | 12/2000 |
| JP | 2001-75815 | 3/2001 |
| JP | 2001-92561 | 6/2001 |
| JP | 2001-166849 | 6/2001 |
| JP | 2001-003421 | 8/2001 |
| JP | 2002-014745 | 1/2002 |
| KR | 10-246855 | 5/1998 |

OTHER PUBLICATIONS

Japanese Office Action dated Jan. 10, 2006 for Japanese App. No. 2002-352199.
Communication from European Patent Office enclosing European Search Report issued with respect to Application No. 03251132.1.

* cited by examiner

*Primary Examiner*—Anatoly Vortman
*Assistant Examiner*—Anthony Q. Edwards
(74) *Attorney, Agent, or Firm*—Staas & Halsey LLP

(57) ABSTRACT

A computer system includes an LCD display part provided with a main housing mounting part in a rear thereof, and a main housing to accommodate a main board and detachably combined with the main housing mounting part of the LCD display part. Different sizes of the LCD display parts are selectively combined with the main housing to be replaced. Thus, the present invention provides a computer system in which different sizes of LCD display parts are replaceable.

23 Claims, 4 Drawing Sheets

COMPUTER SYSTEM HAVING INTERCHANGEABLE LCDS

CROSS-REFERENCE TO RELATED APPLICATION

This application claims the benefit of Korean Application No. 2002-37975, filed Jul. 2, 2002, in the Korean Intellectual Property Office, the disclosure of which is incorporated herein by reference.

BACKGROUND OF THE INVENTION

1. Field of the Invention

The present invention relates to a computer system, and more particularly, to a computer system in which different sizes of LCD (Liquid Crystal Display) display parts are replaced.

2. Description of the Related Art

Generally, a computer system includes a main body having a plurality of hardware components such as a main board equipped with a CPU (central processing unit), a hard disk drive, a graphic card, a floppy disk drive, a CD (compact disk) drive, etc. The computer system also includes a monitor that receives a video signal from the main body and displays a picture, and an input unit such as a keyboard, a mouse, etc., to input a predetermined signal to the main body.

The computer system is classified as a notebook computer system, a desktop computer system, etc. The notebook computer system is relatively slim and light due to its LCD monitor (hereinafter referred to as "LCD display part"), and is typically employed as a portable computer. The desktop computer system is typically designed for use on a desk or a table.

Because the desktop computer system is generally larger in size than the notebook computer system, the desktop computer system occupies a larger space than the notebook computer system. Recently, the LCD display part has been widely used in the desktop computer system instead of a CRT monitor, so that the space occupied by the desktop computer system is decreased. However, the desktop computer system still requires a relatively large space for installation of a main body and a monitor in comparison with that of the notebook computer system. Accordingly, in order to decrease the space occupied by the desktop computer system, there has been proposed a computer in which an LCD display part and a main body are formed as a single body.

As shown in FIG. 1, a conventional computer 100 system includes a front cover 110, a main housing 130 to form a predetermined space by combining with the front cover 110, an LCD display part (not shown) including an LCD panel (not shown) on which a picture is displayed, a PCB (Printed Circuit Board) assembly (not shown) to transmit a video signal to the LCD panel, and a main board (not shown) to control the computer system 100.

The front cover 110 has an opening through which the LCD panel is exposed, and is placed in front of the LCD panel to cover peripheral edges of the LCD panel. The main housing 130 is backwardly recessed to form an accommodating space to accommodate a main board.

The PCB assembly converts a predetermined signal received from the main board into a video signal, and transmits the video signal to the LCD panel. The main board is mounted with a CPU, a graphic card, a sound card, etc., and operates the computer system 100 depending upon electric power supplied from a power supply (not shown).

In accordance with the configuration as described above, the conventional computer system 100 is assembled as follows. First, the main board is accommodated in the accommodating space of the main housing 130, and fastened to the main housing 130 with screws (not shown). Thereafter, the hardware components including the main board, the LCD display part, etc., are electrically connected to each other, and then the front cover 110 and the main housing 130 are combined by screws 150, thereby completing an assembly of the computer system 100.

However, in the conventional computer system 100, because the LCD display part and the main board are disposed between the front cover 110 and the main housing 130, and the front cover 110 and the main housing 130 are combined by the screws 150, it is not easy to disassemble the computer system 100. Further, it becomes difficult to replace the LCD display part with different sizes of LCD display parts.

SUMMARY OF THE INVENTION

Accordingly, it is an object of the present invention to provide a computer system in which an LCD display part is easily disassembled and easily replaced with different sizes of LCD display parts.

Additional objects and advantages of the invention will be set forth in part in the description which follows and, in part, will be obvious from the description, or may be learned by practice of the invention.

The foregoing and other objects of the present invention are achieved by providing a computer system including an LCD display part provided with a main housing mounting part in a rear thereof, and a main housing to accommodate a main board and detachably combined with the main housing mounting part of the LCD display part. In the computer system of the present invention, different sizes of LCD display parts are selectively combined with the main housing to be replaceable.

According to an aspect of the invention, the LCD display parts include main board mounting parts, each having the same combining structures to combine with the main board.

According to an aspect of the invention, the main housing mounting part is provided with a plurality of screw combining arms, and the main housing is provided with a plurality of screw holes corresponding to the screw combining arms.

According to an aspect of the invention, the LCD display parts are provided with a plurality of hook holders at the rear thereof, and the main housing is provided with a plurality of hooks engaged with the hook holders.

According to another aspect of the invention, the LCD display parts include an LCD panel to display a picture thereon, a PCB assembly to transmit a video signal to the LCD panel, and a supporting member to support the LCD panel, and provided with the screw combining arms. The LCD display parts also include a front casing disposed in front of the LCD panel, to cover front edges of the LCD panel, and a rear casing to form a predetermined housing by combining with the front casing.

According to an aspect of the invention, the hook holders are formed on the rear casing.

The foregoing and other objects are also achieved by providing a computer system including a plurality of LCD display parts different in size, and provided with similar main housing mounting parts, and a main housing provided with a display mounting part corresponding to the main housing mounting part, to which one of the LCD display parts is selectively combined.

According to an aspect of the invention, the plurality of LCD display parts include main board mounting parts having similar structures to combine with a main board received in the main housing.

According to an aspect of the invention, the main housing mounting part is provided with a plurality of screw combining arms, and the display mounting part is provided with a plurality of screw holes corresponding to the screw combining arms.

According to an aspect of the invention, the main housing mounting part is provided with a plurality of hook holders, and the display mounting part is provided with hooks protruding toward the LCD display parts to be engaged with the hook holders.

According to another aspect of the invention, the LCD display parts include an LCD panel to display a picture thereon, a PCB assembly to transmit a video signal to the LCD panel, and a supporting member to support the LCD panel, and provided with the screw combining arms. The LCD display parts also include a front casing disposed in front of the LCD panel, to cover front edges of the LCD panel, and a rear casing to form a predetermined housing by combining with the front casing.

The foregoing and other objects are also achieved by providing a method of manufacturing a computer system including providing similar main housing mounting parts to rears of a plurality of LCD display parts different in size from each other, and providing a display mounting part to a main housing, which is combined to each of the main housing mounting parts so as to selectively combine one of the plurality of LCD display parts to the main housing.

BRIEF DESCRIPTION OF THE DRAWINGS

The above and other objects and advantages of the present invention will become apparent and more readily appreciated from the following description of the preferred embodiment, taken in conjunction with the accompany drawings of which.

DETAILED DESCRIPTION OF THE PREFERRED EMBODIMENT

Figure 1:
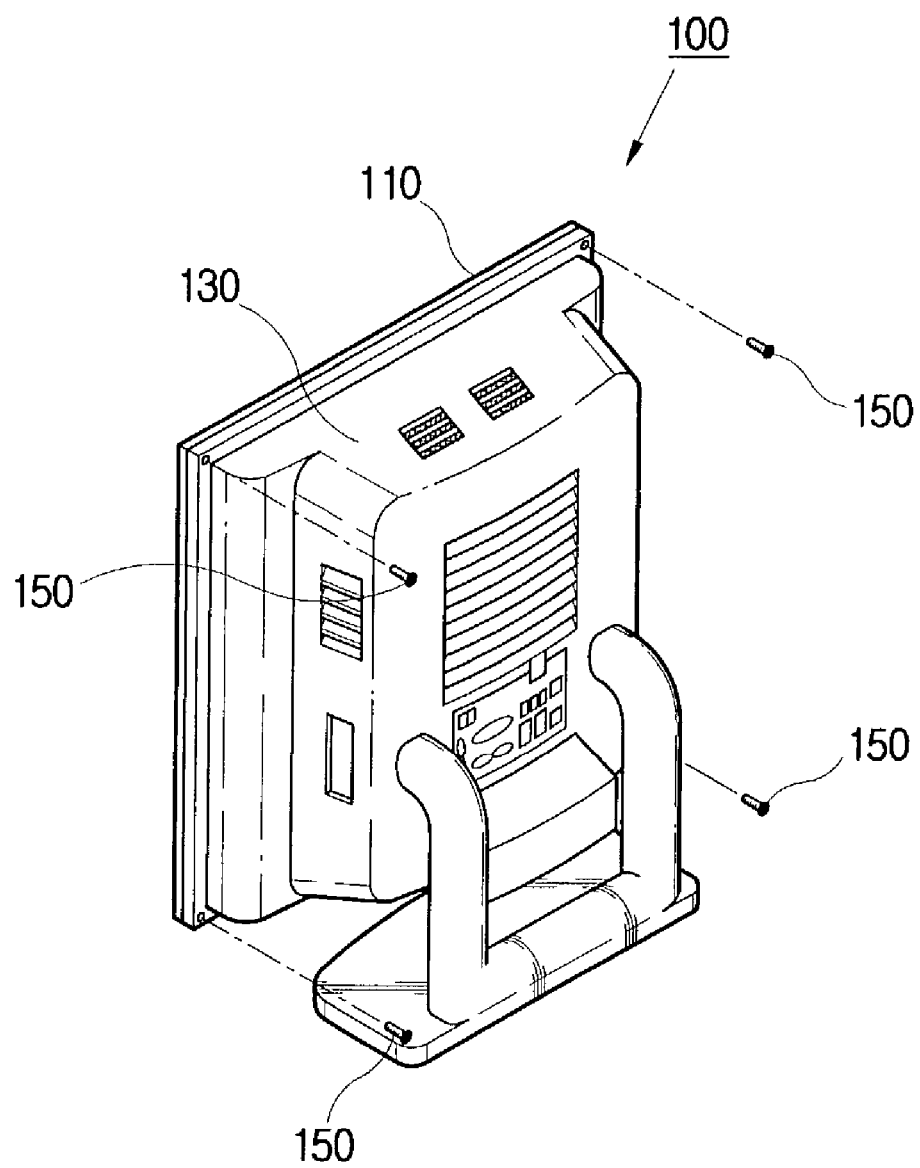
FIG. 1 is a rear perspective view of a conventional computer system.

Reference will now be made in detail to the present preferred embodiment of the present invention, examples of which are illustrated in the accompanying drawings, wherein like reference numerals refer to like elements throughout.

Figure 2A:
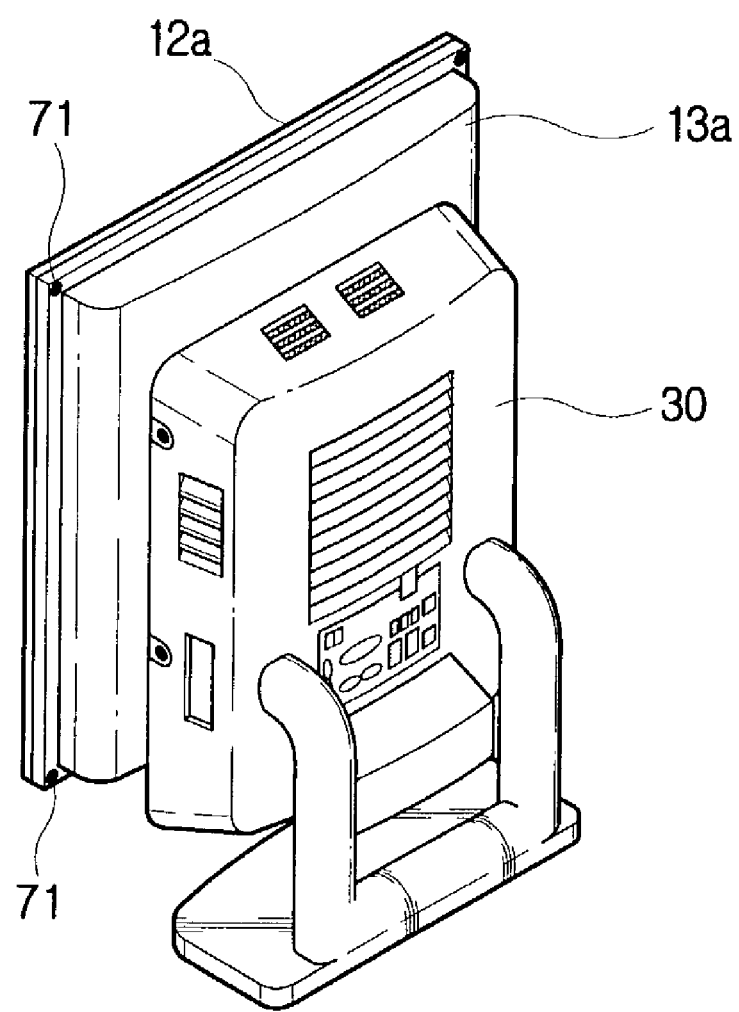
FIG. 2A is a rear perspective view of a computer system equipped with a first LCD display part, according to an embodiment of the present invention.
Figure 2B:
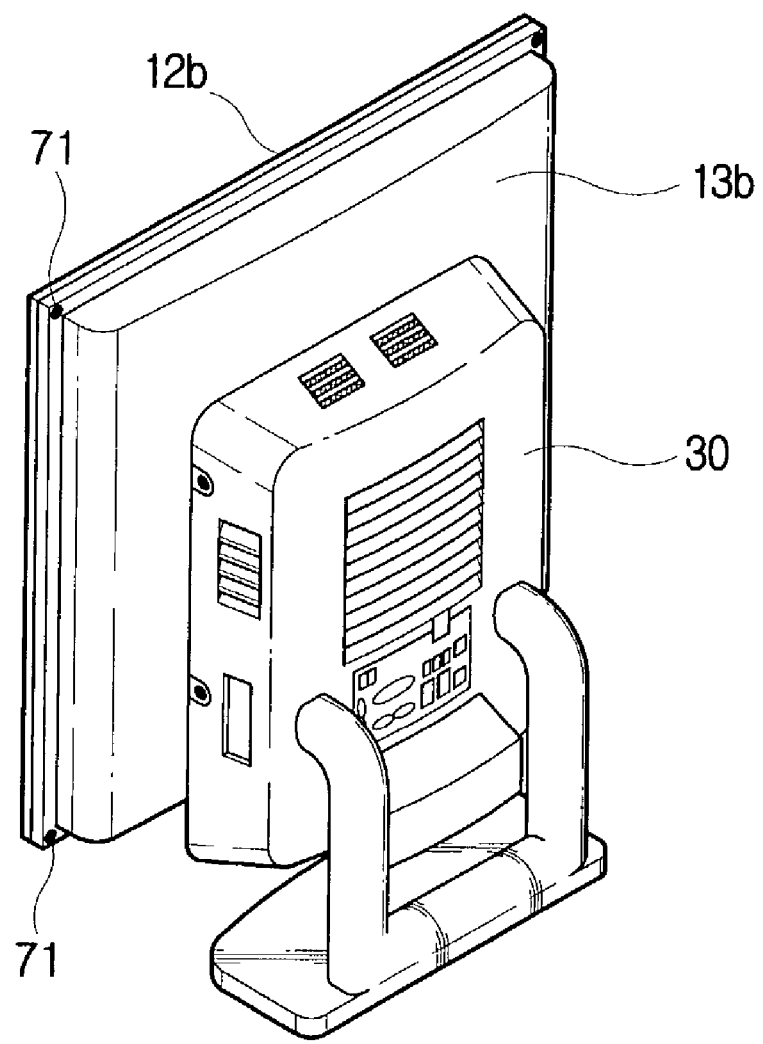
FIG. 2B is a rear perspective view of the computer system equipped with a second LCD display part.
Figure 3:
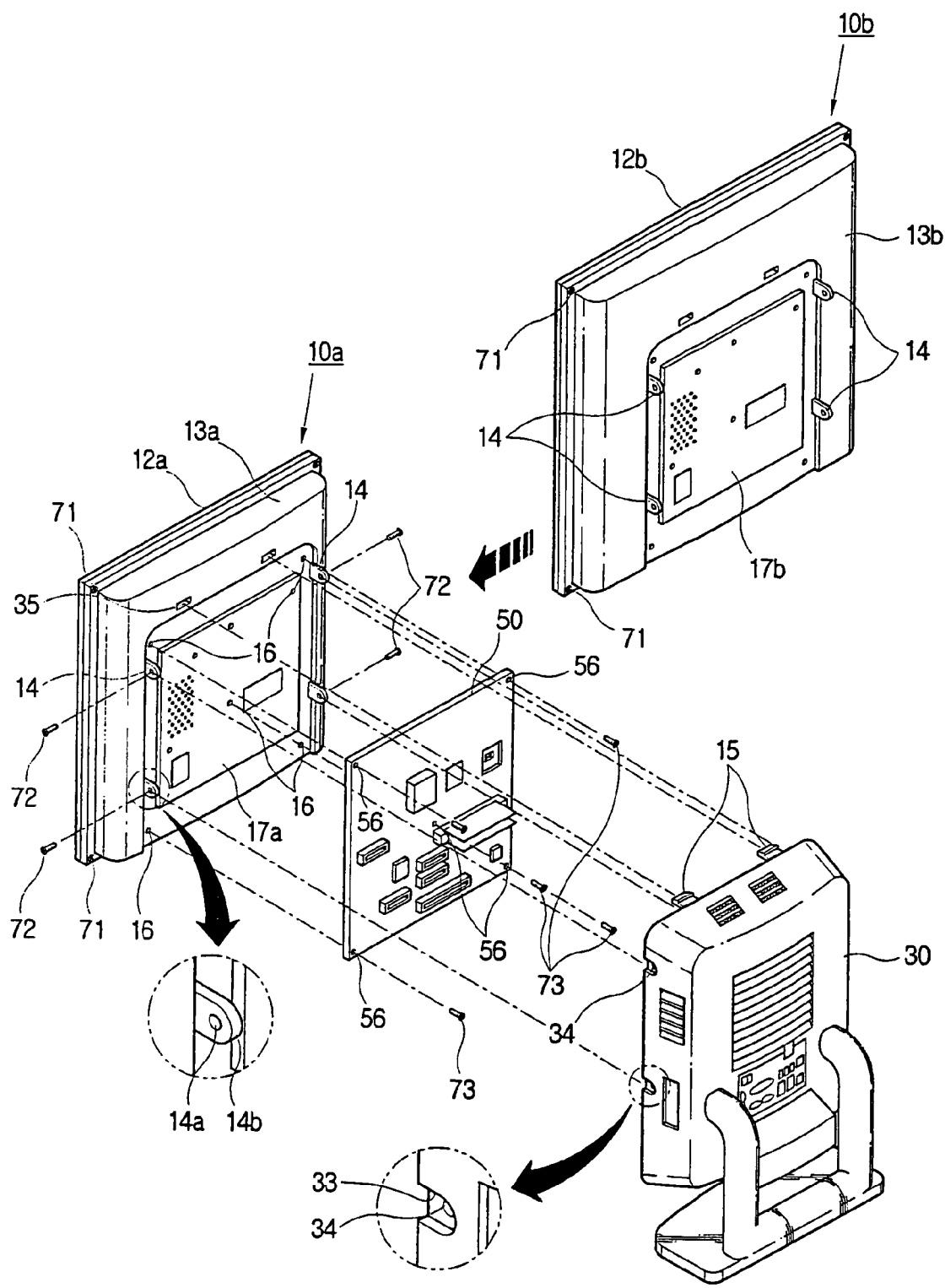
FIG. 3 is an exploded perspective view of the computer system according to the present invention.

As shown in FIGS. 2A, 2B and 3, a computer system according to the present invention includes first and second LCD display parts 10a and 10b, each having main housing mounting parts 14 arranged at the same intervals. The computer system also includes a main housing 30 to accommodate a main board 50 therein, and to selectively combine with one of the first and second LCD display parts 10a and 10b through the main housing mounting parts 14.

The first and second LCD display parts 10a and 10b include LCD panels (not shown) to display a picture thereon, PCB assemblies (not shown) to transmit a video signal to the LCD panel, supporting members 17a and 17b to support the LCD panels, front casings 12a and 12b placed in front of the LCD panels to cover peripheral edges of the LCD panel, and rear casings 13a and 13b to form predetermined spaces by combining with the front casings 12a and 12b, respectively.

The LCD panel changes a molecular arrangement of a liquid crystal thereof when electric power is supplied thereto and interrupts transmission of light to form a picture. Generally, a size of an LCD display part is determined according to a diagonal length of the LCD panel.

The PCB assembly is disposed behind the LCD panel, and provided with an inverter board, a scaler board, an OSD (On Screen Display) board, etc. The PCB assembly converts a predetermined signal received from the main board 50 (to be described later) into a video signal, and transmits it to the LCD panel. The PCB assembly has different components according to sizes of the LCD display parts 10a and 10b. Thus, the first and second LCD display parts 10a and 10b are each equipped with different PCB assemblies.

The supporting members 17a and 17b are disposed behind the PCB assembly, which is disposed behind the LCD panel, to support the LCD panel and the PCB assembly.

The front casings 12a and 12b have openings (not shown) through which the respective LCD panels are exposed, and cover the peripheral edges of the LCD panels. The front casings 12a and 12b are combined to the rear casings 13a and 13b (to be described later) by bolts 71 to form an accommodating space to accommodate the LCD panels.

Behind the first and second LCD display parts 10a and 10b are provided the main housing mounting parts 14, so that the first and second LCD display parts 10a and 10b are selectively combined to the main housing 30. The main housing mounting parts 14 include screw combining arms 14b, and the main housing 30 includes a plurality of screw holes 34 to correspond to the screw combining arms 14b, so that the first and second LCD display parts 10a and 10b are selectively combined to the main housing 30 by first screws 72.

The screw combining arms 14b of the first and second LCD display parts 10a and 10b protrude from side edges of the supporting members 17a and 17b toward the main housing 30. The screw combining arms 14b are formed with through holes 14a. The screw holes 34 of the main housing 30 are formed in groove parts 33 of the main housing 30 to receive the screw combining arms 14b, and correspond to the through holes 14a. Thus, when the LCD display part 10a or 10b is combined to the main housing 30, the screw combining arms 14b thereof are each inserted to the groove parts 33, thereby settling the LCD display part 10a or 10b in a combining position of the main housing 30. The screw combining arms 14b are arranged at opposite sides of the rear of LCD display part 10a or 10b, so as to evenly support a load of the LCD display part 10a or 10b.

Further, the first and second LCD display parts 10a and 10b are provided with a plurality of hook holders 35 arranged at the same intervals above the supporting members 17a and 17b. The main housing 30 is provided with a plurality of hooks 15 to be engaged with the hook holders 35. Thus, when the LCD display part 10a or 10b is combined to the main housing 30, the LCD display part 10a or 10b is firmly settled in the combining position of the main housing 30 by the engagement of the hook holders 35 and the hooks 15 before being fastened with the first screws 72.

The hooks 15 are, as shown in FIG. 3, provided in an upper part of the main housing 30. However, the hooks 15 may be provided on opposite sides of the main housing 30, with the hook holders 35 being provided on the rear of the LCD display part 10a and 10b to correspond to the hooks 15.

Further, the first and second LCD display parts 10a and 10b are provided with main board mounting parts for the main board 50. The main board mounting parts include a plurality of screw holes 16 which are arranged at the same intervals in the supporting members 17a and 17b. A plurality of second screws 73 are provided to go through through holes 56 formed on the main board 50, and are inserted into the screw holes 16 so that the main board 50 is mounted to the rear of the LCD display part 10a or 10b. Thus, even if the LCD display part 10a or 10b is replaced, the same main board 50 may be mounted to either one of the first and second LCD display parts 10a and 10b.

In the foregoing embodiment, the main housing mounting parts 14 include the screw combining arms 14b so as to selectively combine the LCD display parts 10a and 10b to the main housing 30 by first screws 72. However, the main housing mounting parts 14 may include a plurality of locking members such as hooks, etc., so as to selectively combine the LCD display part 10a and 10b to the main housing 30 without screws.

As described above, the LCD display parts 10a and 10b, which are different in size are provided with similar main housing mounting parts 14. Therefore, the LCD display part 10a and 10b is easily separated from the main housing 30, and the main housing 30 is selectively combined with one of the first and second LCD display parts 10a and 10b, which are different in size. Thus, the LCD display part 10a and 10b of the computer system according to the present invention is easily replaceable.

Although a preferred embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A computer system, comprising:
   a main housing to accommodate a main board;
   a first LCD (Liquid Crystal Display) display part provided with a first main housing mounting part detachably combined with the main housing in a rear thereof; and
   at least one of second LCD display parts, each having a different size being different in size from the first LCD display part and provided with a second main housing mounting part having the same combining structure as the first main housing mounting part of the first LCD display part to be replaceable with the first LCD display part,
   wherein the first LCD display part and the second LCD display part respectively include main board mounting parts, each having the same combining structures to connect with the main board and the first main housing mounting part and the second main housing mounting part each comprise a stationary projection and the main housing comprises a recess to receive the respective projection.

2. The computer system according to claim 1, wherein the first main housing mounting part and the second main housing mounting part are respectively provided with a plurality of locking members to combine one of the LCD display part and the second LCD display part with the main housing.

3. A computer system, comprising:
   a main housing to accommodate a main board;
   a first LCD (Liquid Crystal Display) display part provided with a first main housing mounting part detachably combined with the main housing in a rear thereof; and
   at least one of second LCD display parts, each having a different size being different in size from the first LCD display part and provided with a second main housing mounting part having the same combining structure as the first main housing mounting part of the first LCD display part to be replaceable with the first LCD display part,
   wherein the first LCD display part and the second LCD display part respectively include main board mounting parts, each having the same combining structures to connect with the main board, wherein the first main housing mounting part and the second main housing mounting part respectively comprise a plurality of screw combining arms, and the main housing is provided with a plurality of screw holes corresponding to the screw combining arms.

4. The computer system according to claim 3, wherein the first LCD display part and the second LCD display part respectiveiy comprise a plurality of hook holders at the rear thereof, and the main housing is provided with a plurality of hooks engaged with the hook holders.

5. The computer system according to claim 4, wherein the first LCD display part and the second LCD display part respectively include:
   an LCD panel to display a picture thereon;
   a PCB (Printed Circuit Board) assembly to transmit a video signal to the LCD panel;
   a supporting member to support the LCD panel, and provided with the screw combining arms;
   a front casing disposed in front of the LCD panel, to cover front edges of the LCD panel; and
   a rear casing to form a predetermined housing by combining with the front casing.

6. The computer system according to claim 5, wherein the hook holders are formed on the rear casing.

7. The computer system according to claim 5, wherein the supporting member is disposed behind the PCB assembly, which is disposed by the LCD panel, to support the PCB assembly and the LCD panel.

8. The computer system according to claim 3, wherein the screw holes of the main housing are provided in groove parts on sides of the main housing to receive the screw combining arms.

9. The computer system according to claim 8, wherein the screw combining arms are inserted to the groove parts of the main housing to settle one of the first LCD display part and the second LCD display part in a combining position of the main housing.

10. A computer system, comprising:
    a plurality of LCD (Liquid Crystal Display) display parts different in size, and provided with main housing mounting parts having a same combining structure in a rear thereof; and
    a main housing provided with a display mounting part having a combining structure corresponding to the combining structure of the main housing mounting part, to which one of the LCD display parts is selectively combined,
    wherein the plurality of LCD display parts include main board mounting parts having the same combining structures to connect with a main board and the main housing mounting parts each comprise a stationary projection and the main housing comprises a recess to receive the respective projection.

11. The computer system according to claim 10, wherein the main housing mounting part is provided with a plurality of locking members to selectively combine the LCD display parts with the main housing.

12. computer system, comprising:
a plurality of LCD (Liquid Crystal Display) display parts different in size, and provided with main housing mounting parts having a same combining structure in a rear thereof; and
a main housing provided with a display mounting part having a combining structure corresponding to the combining structure of the main housing mounting part, to which one of the LCD display parts is selectively combined, wherein the plurality of LCD display parts include main board mounting parts having the same combining structures to connect with a main board, wherein the main housing mounting part comprises a plurality of screw combining arms, and the display mounting part comprises a plurality of screw holes corresponding to the screw combining arms.

13. The computer system according to claim 12, wherein the main housing mounting part comprises a plurality of hook holders, and the display mounting part comprises hooks protruding toward the LCD display parts to be engaged with the hook holders.

14. The computer system according to claim 13, wherein the LCD display parts include:
an LCD panel to display a picture thereon;
a PCB assembly to transmit a video signal to the LCD panel;
a supporting member to support the LCD panel, and provided with the screw combining arms;
a front casing disposed in front of the LCD panel, to cover front edges of the LCD panel; and
a rear casing to form a predetermined housing by combining with the front casing.

15. The computer system according to claim 12, wherein the LCD display parts include:
an LCD panel to display a picture thereon;
a PCB (Printed Circuit Board) assembly to transmit a video signal to the LCD panel;
a supporting member to support the LCD panel, and provided with the screw combining arms;
a front casing disposed in front of the LCD panel, to cover front edges of the LCD panel;
a rear casing to form a predetermined housing by combining with the front casing.

16. The computer system according to claim 15, wherein the supporting member is disposed behind the PCB assembly, which is disposed by the LCD panel, to support the PCB assembly and the LCD panel.

17. The computer system according to claim 12, wherein the screw holes of the main housing are provided in groove parts on sides of the main housing to receive the screw combining arms of the main housing mounting part.

18. The computer system according to claim 17, wherein the screw combining arms of the main housing mounting part are inserted to the groove parts of the main housing to selectively settle the LCD display parts in a combining position of the main housing.

19. A method of manufacturing a computer system, comprising:
providing similar main housing mounting parts to rears of a plurality of LCD (Liquid Crystal Display) display parts different in size from each other;
providing a display mounting part to a main housing accommodating a main board; and
combining the display mounting cart to one of the main housing mounting parts so as to selectively combine one of the plurality of LCD display parts to the main housing via the respective main housing mounting part comprising receiving a stationary projection of the combined main housing mounting Dart in the recess of the main housing, and
the plurality of LCD display parts including main board mounting parts, each having the same combining structure to connect with the main board.

20. A computer system, comprising:
an LCD (Liquid Crystal Display) display part provided with a main housing mounting part in a rear thereof; and
a main housing detachably combined with the main housing mounting part of the LCD display part, wherein,
the LCD display part is interchangeable with another LCD display part having a different size and a same combining structure as the main housing mounting part of the LCD display part, each of the LCD display parts being selectively combined with the main housing,
the main housing mounting part comprises a plurality of screw combining arms, and the main housing is provided with a plurality of screw holes corresponding to the screw combining arms, and
the screw holes of the main housing are provided in groove parts on sides of the main housing to receive the screw combining arms of the main housing mounting part.

21. A computer system, comprising:
an LCD (Liquid Crystal Display) display part provided with a main housing mounting part in a rear thereof; and
a main housing detachably combined with the main housing mounting part of the LCD display part, wherein,
the LCD display part is interchangeable with another LCD display part having a different size and a same combining structure as the main housing mounting part of the LCD display part, each of the LCD display parts being selectively combined with the main housing,
the main housing mounting part comprises a plurality of screw combining arms, and the main housing is provided with a plurality of screw holes corresponding to the screw combining arms,
the screw holes of the main housing are provided in groove parts on sides of the main housing to receive the screw combining arms of the main housing mounting part, and
the screw combining arms of the main housing mounting part are inserted to the groove parts of the main housing to settle the LCD display part in a combining position of the main housing.

22. A computer system, comprising:
a plurality of LCD (Liquid Crystal Display) display parts different in size, and provided with main housing mounting parts having a same combining structure in a rear thereof; and a main housing provided with a display mounting part corresponding to the main housing mounting part, to which one of the LCD display parts is selectively combined, wherein, the main housing mounting part comprises a plurality of screw combining arms, and the display mounting part comprises a plurality of screw holes corresponding to the screw combining arms, and the screw holes of the main housing are provided in groove parts on sides of the main housing to receive the screw combining arms of the main housing mounting part.

23. A computer system, comprising:

a plurality of LCD (Liquid Crystal Display) display parts different in size, and provided with main housing mounting parts having a same combining structure in a rear thereof; and a main housing provided with a display mounting part corresponding to the main housing mounting part, to which one of the LCD display parts is selectively combined, wherein, the main housing mounting part comprises a plurality of screw combining arms, and the display mounting part comprises a plurality of screw holes corresponding to the screw combining arms, the screw holes of the main housing are provided in groove parts on sides of the main housing to receive the screw combining arms of the main housing mounting part, and the screw combining arms of the main housing mounting part are inserted to the groove parts of the main housing to selectively settle the LCD display parts in a combining position of the main housing.

* * * * *

UNITED STATES PATENT AND TRADEMARK OFFICE
CERTIFICATE OF CORRECTION

PATENT NO. : 7,233,486 B2 Page 1 of 1
APPLICATION NO. : 10/290502
DATED : June 19, 2007
INVENTOR(S) : Tae-sang Kim It is certified that error appears in the above-identified patent and that said Letters Patent is hereby corrected as shown below:

Column 6, Line 24, change "respectiveiy" to --respectively--.

Column 7, Line 7, change "computer" to --A computer--.

Column 7, Line 28, Change "claim 13," to --claim 12,--.

Column 7, Line 31, after "PCB" insert --(Printed Circuit Board)--.

Column 7, Line 39, change "claim 12," to --claim 13,--.

Column 7, Line 42, after "PCB" delete "(Printed Circuit Board)".

Column 7, Line 47, after "panel;" insert --and--.

Column 7, Line 50, change "claim 15," to --claim 14,--.

Column 8, Line 8, change "cart" to --part--.

Column 8, Line 13, change "Dart" to --part--.

Signed and Sealed this

Thirteenth Day of November, 2007

JON W. DUDAS
*Director of the United States Patent and Trademark Office*